United States Patent [19]

Yang et al.

[11] Patent Number: 5,079,280

[45] Date of Patent: Jan. 7, 1992

[54] LOW TEMPERATURE EXPANDABLE VERMICULITE AND INTUMESCENT SHEET MATERIAL CONTAINING SAME

[75] Inventors: Julie C. Yang, Lexington; Charles I. Sanders, Brookline, both of Mass.

[73] Assignee: W. R. Grace & Co.-Conn., New York, N.Y.

[21] Appl. No.: 436,584

[22] Filed: Nov. 15, 1989

[51] Int. Cl.$^5$ ............................................. C08K 21/14
[52] U.S. Cl. .................................... 523/179; 524/450; 252/378 R; 106/415
[58] Field of Search ........................ 523/179; 524/456; 252/378; 106/415

[56] References Cited

U.S. PATENT DOCUMENTS

| | | | |
|---|---|---|---|
| 3,062,753 | 11/1962 | Hayes | 252/378 |
| 3,824,297 | 7/1974 | Wada | 264/25 |
| 3,830,892 | 8/1974 | Wada | 264/25 |
| 3,916,057 | 10/1975 | Hatch et al. | 524/450 |
| 4,305,992 | 12/1981 | Langer et al. | 428/324 |
| 4,401,586 | 8/1983 | Ghiringhelli | 252/378 R |
| 4,497,869 | 2/1985 | Kamigaito et al. | 428/402 |
| 4,715,987 | 12/1987 | Rittler | 252/315.5 |

OTHER PUBLICATIONS

"Interam Fire Protection Products, Systems and Materials for Minimizing Fire Spread and Damage", Minnesota Mining and Manufacturing.

"Fiberfrax XPE and XPE/970 Papers", Standard Oil Engineered Materials.

"The Effect of the Interlayer Cations on the Expansion of the Mica Type of Crystal Lattice", I. Barshad, American Mineral, vol. 35, pp. 225-238, 1950.

"Cation Exchange in Micaceous Minerals: I. Replaceability of the Interlayer Cations of Vermiculite with Ammonium and Potassium Ions", I. Barshad, Soil Science, vol. 77, pp. 463-472, 1954.

"Vermiculites and Some Related Mixed-Layer Minerals", G. F. Walker, *The X-Ray Identification and Crystal Structures of Clay Minerals*, Chapter 7, G. W. Brindley ed., London: 1st Mineral Society of London, 1951.

"Hydration of Vermiculite Saturated with Various Cations", G. F. Walker & A. Milne, Trans. Fourth International Congress of Soil Science, Amsterdam, vol. 2, pp. 62-67.

*Primary Examiner*—Paul R. Michl
*Assistant Examiner*—Edward J. Cain
*Attorney, Agent, or Firm*—John J. Wasatonic; William L. Baker

[57] ABSTRACT

A method of decreasing the expansion temperature and improving the expansion characteristics of vermiculite ore comprising subjecting vermiculite ore containing interlamellar cations to a potassium nitrate solution for a time interval sufficient to ion-exchange interlamellar cations within said ore with potassium ions. Subsequent to this ion exchange the low temperature expandable vermiculite may be expanded by heating in an oven, or incorporated in an intumescent material and heat expanded in situ, or expanded by other heating means. An intumescent sheet is provided which may be used for mounting automotive catalytic converter monoliths comprising an unexpanded vermiculite produced by the method of the invention; an inorganic fibrous material; and a binder.

6 Claims, No Drawings

LOW TEMPERATURE EXPANDABLE VERMICULITE AND INTUMESCENT SHEET MATERIAL CONTAINING SAME

BACKGROUND OF THE INVENTION

The present invention relates to a method of treating vermiculite ore to lower the expansion temperature of the ore and improve the characteristics of the expanded vermiculite. The invention is further directed to intumescent sheet and other intumescent materials containing low temperature expandable vermiculite prepared according to the invention.

Vermiculite is a micaceous mineral, chemically identified as a hydrated magnesium-aluminum-iron silicate and characterized by a layered structure which exfoliates or expands in one dimension when heated at high temperatures or subjected to various chemical treatments, so as to be increased to many times its original size. The mineral ore occurs naturally in an unexpanded state, and is mined in conventional manner.

Since vermiculite as it is mined in the form of vermiculite ore is associated with other minerals as impurities, the crude vermiculite ore, after being reduced to particle size, has generally been beneficiated by various concentrating methods well known in the art wherein the gangue material is separated from the vermiculite particles as much as possible, the vermiculite screened into a number of component sizes and the vermiculite heated at elevated temperatures, typically approximately 1800° F., until expansion occurs.

It has been an important goal to find a means and method of lowering the expansion temperature of vermiculite ore, both for economic reasons, and so that the vermiculite may be used in applications where a material is required which may be expanded in situ at relatively low temperatures. However, at lower expansion temperatures untreated vermiculite either will not expand at all, or will not yield an acceptable volume of expanded product.

It is known to increase the volume yield of vermiculite, and slightly decrease the expansion temperature, by osmotically swelling the vermiculite ore prior to expansion by treating the ore with various solutions containing alkali or alkaline earth salts. Such a method is described in U.S. Pat. No. 3,062,753. This method succeeds in increasing the yield of the ore, but the expansion temperature is still uneconomical and too high for the vermiculite to be used in many applications.

This method, and other previously known methods of treating vermiculite with salt solutions, also have several accompanying disadvantages. First, intumescent materials containing the expandable vermiculite thus produced tend to shrink upon initial heating, especially when the vermiculite is incorporated in intumescent gasket materials and expanded in situ under load, (this shrinkage is generally referred to in the art, and will be referred to herein, as "negative expansion"). This negative expansion may be deleterious in some applications, e.g. intumescent gasketing applications where it may interfere with the formation of a tight seal. Secondly, the disposal of the solutions used must be carefully monitored, especially when the salt used is an alkali or alkaline earth chloride, as these solutions are considered potentially hazardous to the environment. Furthermore, the residual chloride ions contained in the expanded vermiculite may be corrosive in certain applications and are undesirable in agricultural and horticultural applications.

The expansion temperature of vermiculite ore may be lowered, and the tendency of the sheet containing the vermiculite to undergo negative expansion reduced, by treating the vermiculite ore with ammonium cations, as disclosed in U.S. Pat. No. 4,305,992, the disclosure of which is incorporated herein by reference. However, the ammonium solutions used in this process tend to be relatively costly, and the disposal of the resulting waste stream also must be closely monitored as the waste is potentially hazardous. Also, the expansion temperatures thus obtained are still too high for many applications in which it would be desirable to use vermiculite.

It has been desired to use vermiculite in materials which are designed to expand when exposed to heat, i.e. intumescent materials. These intumescent materials are used in many applications including fireproofing, insulation and gasketing. Vermiculite is also useful in fireproofing materials referred to as endothermic materials, which block heat penetration by absorbing energy chemically. Intumescent sheet materials containing vermiculite generally comprise vermiculite, inorganic and organic fibers, low density fillers, e.g. hollow glass microspheres, and organic binders. Vermiculite is useful in these applications both because it expands when exposed to heat, typically from 8 to 20 times, and thus can seal flames and heat out of openings, ducts, and other areas, and because of its ability to block heat penetration by absorbing energy via chemically bound interlayer water and other volatiles.

An intumescent sheet comprising unexpanded ammonium ion exchanged vermiculite, inorganic fibrous materials and binders is disclosed in the aforementioned U.S. Pat. No. 4,305,992. This flexible intumescent sheet material is utilized in automobile exhaust catalytic converters as a mounting material by expansion in situ. The expanded sheet then holds the ceramic core or catalyst support in place in the container or canister. The thermal stability and resilience of the sheet after exfoliation compensate for the difference in thermal expansion of the metal canister and the ceramic substrate, for vibration transmitted to the fragile device and for irregularities in the metallic or ceramic surfaces. Generally, in this application intumescent sheets are expanded in situ by the catalytic converter manufacturer by connecting the converter to an automobile exhaust system and running the automobile until the intumescent sheet expands fully.

One disadvantage of conventional intumescent materials is that they generally undergo negative expansion when exposed to temperatures of from 230° F. to 750° F. In gasket applications, such as the packing and mounting of automobile catalytic converters, this negative expansion may cause the mounted catalyst support to become undesirably loose when these temperatures are encountered and remain loose until such time as the intumescent sheet material has passed through the negative expansion region and expanded sufficiently to recover its original thickness.

SUMMARY OF THE INVENTION

The present invention relates to a method of treating vermiculite ore to lower the expansion temperature of the ore and provide improved properties to the vermiculite. The invention is further directed to intumescent materials, and particularly intumescent sheet materials, containing low temperature expandable vermiculite prepared according to the invention, which vermiculite expands within the intumescent material at advantageously low temperatures and exhibits minimal negative expansion.

More particularly, the present invention provides a method of treating vermiculite ore containing interlamellar cations to lower its expansion temperature comprising subjecting vermiculite ore containing interlamellar cations to a potassium nitrate solution for a time interval sufficient to ion-exchange interlamellar cations within said ore with potassium ions.

The low temperature expandable vermiculite thus produced may be thermally expanded using conventional apparatus such as expansion ovens well known in the art. Alternatively, the vermiculite may be incorporated in an intumescent material, such that the vermiculite will expand in situ when the intumescent material is exposed to sufficient heat.

The present invention further relates to an intumescent sheet containing the low temperature expandable vermiculite of the invention. More particularly, the present invention relates to a flexible intumescent sheet which may be used for mounting automotive catalytic converter monoliths comprising an unexpanded vermiculite produced by subjecting vermiculite ore containing interlamellar cations to a potassium nitrate solution for a time interval sufficient to ion-exchange interlamellar cations within said ore with potassium ions; an inorganic fibrous material; and a binder. This sheet will expand quickly at a relatively low temperature, saving production time and gasoline for the manufacturer and reducing the exhaust produced in the factory per converter. In a preferred embodiment, the flexible intumescent sheet comprises from 20% to 80%, and preferably from 40% to 65% by weight of the ion exchanged vermiculite, from 25% to 50% by weight of the fibrous material, and from 5% to 15% by weight of the binder.

The intumescent materials of this invention may also advantageously be used in fireproofing and heatproofing applications due to the high level of bound volatiles in the vermiculite, and thus the endothermic nature of the treated vermiculite contained in the sheet.

DETAILED DESCRIPTION OF THE INVENTION

The term vermiculite, as it is used herein, refers to the group of rock forming mineral species characterized by a layer latticed structure in which the silicate layer units have a thickness of approximately 10 angstroms. The main elements present in the layer are magnesium, aluminum, silica, iron and oxygen with the layers being separated by one or two sheets of water molecules associated with cations such as magnesium, calcium, sodium and hydrogen. The layers have considerable lateral extent relative to the thickness of the basic 10 angstrom unit layer. The term vermiculite as used herein therefore includes minerals consisting wholly or largely of vermiculite, or minerals of a mixed-layer type containing vermiculite layers as an important constituent, such as hydrobiotites, and chlorite-vermiculite, but does not include minerals of the montomorillonite group.

Heretofore, the degree to which the expansion temperature is lowered by ion exchanging the vermiculite with a given salt solution has been attributed primarily to the type of cation present in the solution. The anion component of the salt has been given less consideration, and has conventionally been chloride. Unexpectedly, it has been found by the inventors that the expansion temperature and characteristics of the cation exchanged vermiculite can be determined by the combination of cation and anion used. In particular, it has been found that the use of the nitrate salt of potassium provides substantial improvements in both the yield of expanded vermiculite and the expansion characteristics, as opposed to that obtained with other potassium salts and other anionic components. Thus, as shown in Example 1, potassium nitrate exchanged vermiculite has, after expansion at a given temperature, a significantly lower bulk density, and thus higher yield, than ammonium nitrate or potassium chloride exchanged vermiculite. Example 1 also shows that superior yields can be obtained when potassium nitrate exchanged vermiculite is expanded at temperatures as low as 475° F., whereas higher temperatures are required to obtain equivalent yields with ammonium nitrate or potassium chloride exchanged vermiculite. Generally, when potassium nitrate exchanged vermiculite is expanded at 475° F. or above the resulting bulk density is less than 30 lbs/ft$^3$. The use of a potassium nitrate solution is also desirable from the standpoint of disposal, as this solution can be recycled as a fertilizer without risk to the environment.

The potassium ion exchange generally takes place by subjecting the vermiculite ore to an aqueous solution of potassium nitrate. The concentration of the potassium nitrate solution is preferably from 0.1 to 5 molar, and most preferably from 0.5 to 2.5 molar. When ammonium ion exchange is performed, the optimal concentration is generally 5 molar, making potassium nitrate significantly more cost effective.

The optimum duration of ion exchange is directly dependent on the concentration and temperature of the potassium nitrate solution. Generally, the duration of the ion exchange is from 0.5 to 72 hours, and preferably from 10 to 36 hours. The preferred exchange conditions for a 1 molar solution are 24 hours at room temperature. However, shorter exchange times at higher temperatures may be used, e.g. 4 hours at 200° F. When weaker solutions are used longer exchange times may be necessary to achieve the same yield.

The weight ratio of vermiculite to salt solution also influences the expansion characteristics of the ion exchanged vermiculite. Preferred ratios are from about 0.5:1.5 to about 1.5:0.5, with the most preferred ratio generally being about 1:1.

It is generally preferred that the excess solution be decanted and the vermiculite be rinsed subsequent to ion exchange in order to remove any excess salt. The vermiculite may be rinsed with distilled water, and it is preferred that the vermiculite be rinsed several times. It is also preferred that the vermiculite be dried prior to expansion. Generally the vermiculite is allowed to air dry at room temperature. The cation exchanged vermiculite of the invention may then be expanded using conventional techniques and equipment.

Generally, the expansion temperature of vermiculite which has been cation exchanged with potassium nitrate is lower than the expansion temperatures of similar vermiculite ore which has been treated under similar conditions with other salt solutions. For example, initial expansion temperatures of intumescent sheets containing vermiculite which had been cation-exchanged under similar conditions with potassium nitrate, ammonium nitrate, potassium chloride, and ammonium chloride, as measured using Thermal Mechanical Analysis, were approximately 465° F., 490° F., 520° F. and 520° F. respectively.

For advantageous yields it is preferred to expand the vermiculite of the invention at a temperature of at least 475° F., and most preferably in the range of from 475° F. to 600° F. The minimum expansion temperature of the cation exchanged vermiculite, and the preferred temperature for full expansion, will depend on the type and grade of vermiculite used, due to differences in the mineral and moisture contents of the ores. The expansion process proceeds very quickly; for example within 10 minutes full expansion is generally obtained.

The flexible intumescent sheet material according to the invention comprises unexpanded vermiculite prepared according to the invention, one or more inorganic fibrous materials, and one or more binders. Preferably, the intumescent sheet of the invention comprises from about 40% to 65% potassium nitrate exchanged vermiculite, from about 25% to 50% of the fibrous material, and from about 5% to 15% of the binder.

Inorganic fibrous materials which may be used include glass fibers, slag, rock and ceramic fibers. A preferred fibrous material is ceramic fibers.

Suitable binders can include various polymers and organic elastomers in latex form, as for example, natural rubber latexes, styrene-butadiene latexes, butadiene-acrylonitrile latexes, latexes of acrylate and methacrylate polymers and copolymers and the like.

The sheet material may be formed by standard papermaking techniques, either hand laid or machine laid, taking suitable precautions to attain substantially uniform distribution of particles throughout the web. The sheet material may be provided with or temporarily laminated to a backing sheet of kraft paper, plastic film, non-woven synthetic fiber web or the like as desired. Generally, the potassium nitrate treated vermiculite is combined in a large volume of water with the fibrous material and binder. Small amounts of surfactants, foaming agents and flocculating agents may also be added before forming the sheet. The sheet is then formed by standard papermaking techniques either in a hand-sheet former or Fourdrinier screen. The resulting green sheet is compressed to give a dry weight density of generally at least 0.35 g/ml, and dried at relatively low temperature, generally less than about 90° C., to form a handleable, flexible sheet material.

After drying, the intumescent sheet may be employed in any application where it is desired to employ a heat expandable, heat resistant sealing or filling material. A preferred use for the intumescent sheets of the invention is as a packing for mounting and positioning automotive catalytic converter monoliths. The intumescent sheet, when used in this application, is wrapped around a catalytic converter core, and the core and sheet are placed inside an outer metal canister. The resulting assembly is then usually mounted in an automobile in standard fashion and heated, generally by the engine exhaust gases, to expand the intumescent sheet. Using the intumescent sheet of the invention, the sheet will generally expand upon reaching a temperature of approximately 475° F.

Intumescent sheets produced according to the invention generally have initial expansion temperatures in the range of from 400° F. to 600° F., have a maximum negative expansion of about 5% at about 425° F., and return to at least original thickness at about 480° F. These properties are better than those obtained with intumescent sheets produced with vermiculite which has been treated with other salt solutions, as measured by Thermal Mechanical Analysis.

The following examples are intended to be illustrative only and not of limiting effect.

EXAMPLE 1

Four samples of a vermiculite ore were cation exchanged for 24 hours at room temperature with 1 molar solutions of potassium nitrate, ammonium nitrate, potassium chloride and ammonium chloride, respectively. The cation exchanged vermiculites were then each rinsed five times with distilled water after the excess salt solution was decanted, and then allowed to air dry at room temperature until substantially dry.

Each vermiculite sample was then separated into three batches, one of which was expanded at 475° F., one at 530° F., and one at 600° F. All samples were expanded in a conventional expansion oven. After expansion, the samples were tested for bulk density, with results as shown in Table 1.

The data of Table 1 show that the expanded vermiculite which had been cation exchanged with potassium nitrate had significantly lower bulk density, and thus was more fully expanded, after expansion at a given temperature than the vermiculite which had been cation exchanged with other salts. Further, the bulk density obtained for the potassium nitrate treated vermiculite which was expanded at 475° F. was much lower than that of the other samples which were expanded at the same temperature, and equivalent to the bulk density obtained for the other samples which were expanded at 530° F., indicating a lower initial expansion temperature and more complete expansion at the low expansion temperature.

TABLE 1

| Sample | Treated With | Bulk Density (lb/ft$^3$) When Expanded at | | |
|---|---|---|---|---|
| | | 475° F. | 530° F. | 600° F. |
| 1 | KNO$_3$ | 24.3 | 14.8 | 11.0 |
| 2 | NH$_4$NO$_3$ | 44.9 | 24.3 | 17.1 |
| 3 | KCl | 62.3 | 24.0 | 17.0 |
| 4 | NH$_4$Cl | 61.8 | 45.1 | 22.8 |

EXAMPLE 2

A 2 kilogram batch of vermiculite ore was separated into two 1 kilogram samples, which were exchanged for 24 hours at room temperature with 1 molar solutions of potassium nitrate and ammonium chloride, respectively. The solutions were then decanted from the samples and each sample was dried overnight at 140° F.

Next, two intumescent sheets were identically prepared using the procedure described below, one using the potassium nitrate exchanged vermiculite, and the other using the ammonium chloride exchanged vermiculite.

In a blender, 15.4 grams of alumina-silica ceramic fibers (washed Fiberfrax available from the Carborundum Co.) were added to 1000 ml of water and agitated. This mixture was then transferred to a beaker and 10 ml of a 0.1% solution of sodium acrylate/acrylamide copolymer surfactant (commercially available from Allied Colloids under the tradename Percol 166) and 10 ml of a 0.1% solution of a quaternary acrylate salt/acrylamide copolymer surfactant (Percol 292) were added. The mixture was then stirred with a mechanical stirrer at low speed. To this mixture, 28 grams of vermiculite (see above), and 8 grams Hycar ® 1562X103 (a 40% solution of butadiene-acrylonitrile latex, commercially available from B. F. Goodrich Chemical Co.) were added, and the mixture was again mixed at low speed. The mixture was then returned to the blender and flocculated with a 10% aluminum sulfate solution (sufficient to reduce the pH to a range of 4.5-5).

The resulting slurry was poured into approximately 0.5 inch of water in an 8 inch diameter hand sheet former (available from Valley Iron Works, Appleton, Wis.) and the water drawn off. The wet intumescent paper thus produced was then dried on a steam table.

The relative expansion of the two papers was tested as follows. The initial thickness of the intumescent paper ($T_0$) was measured using an Ames ADI-71 thickness gauge with the spring removed and an external 28 gram weight added. The paper was then expanded at a given temperature (see Table 2) in a conventional forced air oven for 60 minutes. The expanded thickness ($T_E$) was then measured using the procedure described above. The relative expansion ($T_E/T_0$) was then calculated for each sample, with results as shown in Table 2. The data of Table 2 indicates that while the relative expansions of the two papers are similar when expanded at 350° F., the papers containing the potassium nitrate expanded vermiculite expanded significantly more than those containing ammonium chloride exchanged vermiculite at both 400° F. and 450° F.

TABLE 2

| Intumescent Sheet Containing | $T_E/T_0$ | | |
|---|---|---|---|
| | 350° F. | 400° F. | 450° F. |
| KNO$_3$ Exchanged Vermiculite | 1.14 | 1.94 | 2.71 |
| NH$_4$Cl Exchanged Vermiculite | 1.18 | 1.25 | 1.57 |

EXAMPLE 3

Four different batches of vermiculite ore were provided. Each vermiculite batch was separated into two samples (samples 1-8 in Table 3). Samples 1, 3, and 5 were cation exchanged for 24 hours at room temperature with a 1 molar solution of potassium nitrate, samples 2, 4, and 6 were cation exchanged for 24 hours at room temperature with a 1 molar solution of ammonium chloride, and samples 7 and 8 were cation exchanged for 24 hours with 0.5 molar solutions of potassium nitrate and ammonium chloride, respectively. The cation exchanged vermiculites were rinsed and then partially dried.

Each vermiculite sample was then separated into two portions, one of which was dried at 140° F. for 20 hours ($D_{LT}$), and the other of which was dried at 1625° F. for 2 minutes ($D_{HT}$). The low temperature drying volatilized the loosely bound or adsorbed volatiles in the vermiculite, while the high temperature drying volatilized both loosely bound/adsorbed and tightly bound volatiles. The difference in weight loss obtained using the two drying processes ($D_{HT}$-$D_{LT}$), indicates the amount of tightly bound interlayer volatiles contained in the vermiculite.

The data of Table 3 shows that for a given batch of ore, the tightly bound interlayer volatile level (percent interlayer volatile, ($D_{HT}$-$D_{LT}$) is greater for potassium nitrate exchanged vermiculite than for ammonium chloride exchanged vermiculite. The percent interlayer volatile of vermiculite which has been cation exchanged in a given solution can vary from one batch of vermiculite ore to another, as seen in Table 3, due to minerological, morphological, compositional and other differences between ores.

TABLE 3

| Sample | Exchange Solution | Batch | $D_{HT}$ (%) | $D_{LT}$ (%) | $D_{HT} - D_{LT}$ (%) |
|---|---|---|---|---|---|
| 1 | KNO$_3$ | 1 | 17.2 | 3.2 | 14.0 |
| 2 | NH$_4$Cl | 1 | 16.9 | 7.9 | 9.0 |
| 3 | KNO$_3$ | 2 | 10.8 | 0.4 | 10.4 |
| 4 | NH$_4$Cl | 2 | 7.7 | 0.4 | 7.3 |
| 5 | KNO$_3$ | 3 | 15.8 | 7.4 | 8.4 |
| 6 | NH$_4$Cl | 3 | 6.0 | 0.4 | 5.6 |
| 7 | KNO$_3$ | 4 | 16.0 | 1.3 | 14.7 |
| 8 | NH$_4$Cl | 4 | 7.8 | 1.1 | 6.7 |

What is claimed is:

1. A flexible intumescent sheet comprising:
   a) an unexpanded vermiculite produced by subjecting vermiculite ore containing interlamellar ions to a potassium nitrate solution for a time interval sufficient to ion-exchange interlamellar cations within said vermiculite ore with potassium ions;
   b) an inorganic fibrous material; and
   c) a binder.

2. An intumescent sheet of claim 1 comprising from 40% to 65% by weight of the unexpanded vermiculite.

3. An intumescent sheet of claim 1 comprising from 25% to 50% by weight of the inorganic fibrous material.

4. An intumescent sheet of claim 1 comprising from 5% to 15% by weight of the binder.

5. An intumescent sheet of claim 1 wherein the inorganic fibrous material is ceramic fibers.

6. An intumescent sheet of claim 1 wherein the binder is an organic elastomer.

* * * * *